(12) United States Patent
Wett (10) Patent No.: US 10,322,359 B2
(45) Date of Patent: Jun. 18, 2019

(54) METHOD FOR DRAINING WATER FROM A TANK

(71) Applicant: Bernhard Wett, Innsbruck (AT)

(72) Inventor: Bernhard Wett, Innsbruck (AT)

( * ) Notice: Subject to any disclaimer, the term of this patent is extended or adjusted under 35 U.S.C. 154(b) by 0 days.

(21) Appl. No.: 15/568,698

(22) PCT Filed: Apr. 25, 2016

(86) PCT No.: PCT/AT2016/050112
§ 371 (c)(1),
(2) Date: Oct. 23, 2017

(87) PCT Pub. No.: WO2016/168880
PCT Pub. Date: Oct. 27, 2016

(65) Prior Publication Data
US 2018/0043286 A1    Feb. 15, 2018

(30) Foreign Application Priority Data
Apr. 23, 2015 (AT) .............................. A 50326/2015

(51) Int. Cl.
*B01D 21/24* (2006.01)
*F04F 10/00* (2006.01)
*B01D 21/34* (2006.01)

(52) U.S. Cl.
CPC ......... *B01D 21/2444* (2013.01); *B01D 21/34* (2013.01); *F04F 10/00* (2013.01); *Y10T 137/2815* (2015.04); *Y10T 137/2822* (2015.04); *Y10T 137/2849* (2015.04); *Y10T 137/2856* (2015.04); *Y10T 137/2937* (2015.04); *Y10T 137/2978* (2015.04); *Y10T 137/86348* (2015.04)

(58) Field of Classification Search
CPC ......... Y10T 137/2849; Y10T 137/2822; Y10T 137/86348; Y10T 137/2815; Y10T 137/2856; Y10T 137/2978; Y10T 137/2937; B01D 21/2444; F04F 10/00
See application file for complete search history.

(56) References Cited

U.S. PATENT DOCUMENTS

| | | | | |
|---|---|---|---|---|
| 3,424,186 A * | 1/1969 | Sparks | ................ | C22B 21/0084 137/205 |
| 3,487,847 A * | 1/1970 | Scott | ...................... | A01K 39/02 137/209 |
| 4,029,584 A * | 6/1977 | Takemoto | ............ | B01D 21/245 137/171 |
| 4,625,752 A * | 12/1986 | George | .................. | A01K 63/04 137/124 |

(Continued)

FOREIGN PATENT DOCUMENTS

| CA | 2280216 | 2/2006 |
|---|---|---|
| CN | 202003236 | 10/2011 |

(Continued)

OTHER PUBLICATIONS

English Abstract of EP1731487.
English Abstract of CN 202003236.

*Primary Examiner* — Atif H Chaudry
(74) *Attorney, Agent, or Firm* — Dykema Gossett PLLC (57) ABSTRACT

The invention relates to a method for draining water from a tank (22), more particularly a clarification tank, wherein water is optionally drained via a draining apparatus while maintaining a substantially constant liquid level (23).

16 Claims, 7 Drawing Sheets

(56) References Cited

U.S. PATENT DOCUMENTS

| | | | | |
|---|---|---|---|---|
| 4,887,667 A | * | 12/1989 | Kuhara | F04F 10/00 |
| | | | | 126/590 |
| 5,009,261 A | | 4/1991 | Kahara | |
| 5,282,487 A | * | 2/1994 | Timpany | B01D 21/0024 |
| | | | | 137/209 |
| 5,540,257 A | * | 7/1996 | Guilleux | G05D 7/03 |
| | | | | 137/209 |

FOREIGN PATENT DOCUMENTS

| | | | | |
|---|---|---|---|---|
| EP | 1731487 | | 12/2006 | |
| EP | 1731487 A1 | * | 12/2006 | B01D 21/2444 |
| FR | 645285 | | 10/1928 | |

\* cited by examiner

METHOD FOR DRAINING WATER FROM A TANK

The invention relates to a method for draining water from a tank, in particular from a clarification tank, wherein the water is optionally drained via a draining apparatus while maintaining a substantially constant liquid level.

The drainage of water from clarification tanks is typically conducted via draining apparatuses which have mechanically actuable closing elements, such as valves, slides or the like. In view of the impurities contained in the water, such closing elements are complex and susceptible to faults.

From EP 0 979 668 A, a floating drain for sewage treatment plants according to the SBR principle is known, in which a floating body is provided which is placed on a joint parallelogram in order to adapt to the variable liquid level. The drainage of water from this floating body can be controlled by selective supply of compressed air. This device is also complex and maintenance-intensive.

It is the object of the present invention to specify a method and an apparatus which make it possible to present cyclic processes in sewage treatment plants in a simple and cost-effective manner by controlling the drainage of water to a large extent free from mechanical actuations.

According to the invention, such a method is characterized in that the drainage is triggered by a selective supply of compressed air into a blocking volume which is provided above at least one drainage opening of a discharge device firmly fixed in the tank.

Compressed air in this context means air which is under a slight excess pressure which is sufficient to lower the liquid level in the blocking volume to a level below the liquid level in the remaining tank. In the ideal case, no air flows out of the blocking volume via the draining edge into the tank, as a result of which the air consumption is minimized. A slight outflow of air, however, is not detrimental to the method according to the invention. Typically, the excess pressure of the compressed air is in a range between 5 mbar and 100 mbar. The required compressed air can either be generated directly via a compressor and pressed into the blocking volume, or the required air quantity is maintained under the necessary minimum pressure in a pressure wind vessel and, if required, pressed into the blocking volume. With the aid of a pressure wind vessel it is possible to use an air pump with very low power without impairing the effectiveness of the apparatus. A further possibility is to use an existing tank ventilation system, wherein the necessary press-in pressure is controlled via a valve by means of the hydrostatic pressure on the aerators dipped into a tank.

An essential aspect of the method according to the invention is that it is possible in this way to keep the liquid level in the tank substantially constant, but at the same time to optionally draw off water or interrupt the drainage. If compressed air is introduced into the blocking volume, then this prevents the inflow of water into the drainage opening. In this case, the liquid level is, for example, regulated by means of an inlet into another tank. Small fluctuations in the liquid level may occur in this context, although the volume variation of the tank content is slight.

If the blocking volume is deaerated, the water can then flow freely into the drainage opening and is thus withdrawn from the tank, wherein the drainage is terminated at the latest when the liquid level falls to the level of the drainage opening.

In a preferred embodiment variant of the method according to the invention, it is provided however that the withdrawn water is allowed to flow into an overflow chamber via a siphon bow with an overflow weir, via which the water can flow off freely. In this way, the liquid level in the tank is determined by the height of the overflow weir and is permanently above the drainage opening in normal operation. In a further embodiment variant, the siphon bow is pulled up to the region of the desired height of the tank water level, and the free drainage of the liquid takes place via the pipe overflow edge.

It is to be noted that the liquid level in the tank shown above is largely constant, i.e. it fluctuates only in the range of a few centimeters. In contrast thereto, it is important that the liquid level in the blocking volume is subjected to relatively strong fluctuations, depending on the compressed air supply, namely between a height above and a height below the drainage opening.

The invention also relates to a draining apparatus for draining water from a tank, in particular from a clarification tank, comprising a discharge device immersed in the tank and having at least one drainage opening which opens into the tank, wherein the discharge device is closed off by a cover in order to form a blocking volume between the discharge device and the cover, and wherein a device is provided for selectively supplying compressed air into the blocking volume.

According to the invention, this apparatus is characterized in that the draining apparatus is fixedly mounted in the tank.

The apparatus according to the invention thus makes do without mechanically movable components, apart from any compressed air valves.

In a particularly preferred embodiment variant of the present invention, it is provided that the discharge device is designed as a horizontally disposed drainage pipe, and that the drainage opening is preferably arranged on the upper side thereof. It is thus possible to draw off water with very low flow velocities, for example, over substantial parts of one side of the tank since the pipe can be designed in any desired length.

It is particularly favourable if the cover is designed as a body concentric to the drainage pipe, which has at least one draining edge on its underside, and that an annular space with a substantially uniform thickness is preferably formed between the drainage pipe and the body. The concentric body is thus formed, for example, as a half-shell of a drainage pipe. It has been found that the undisturbed laminar flow forming in the annular space permits a very selective regulation of the outflowing water. A particularly high efficiency is provided when two mutually parallel draining edges are provided, which are preferably arranged at the same height.

As already explained above, it has been found to be advantageous if the drainage opening is arranged below a liquid level which is to be kept constant. This provides, in addition to the draining edge, additional protection against the intake of floating bodies. It is particularly advantageous in this context if the discharge device is directly connected to an overflow area, which is closed by an overflow weir. The height of the overflow weir is thus decisive for the liquid level in the tank.

The repair and maintenance of the discharge device can be facilitated, in particular, by the fact that the cover can be lifted or removed.

In a simplified embodiment variant, the cover is dispensed with and the blocking volume is introduced directly into the drainage pipe. For this purpose, the drainage openings must be provided in the lower part of the drainage pipe. The drainage openings can then at the same time form the draining edges and the overflow opening for excess compressed air. An undesirable penetration of liquid into the siphon bow as a result of fluctuations in the pressure level in the tank can be prevented by an upwardly directed threshold in the drainage pipe in front of the downward-guided siphon bow. This threshold can, for example, be designed as a pipe bow or merely as a welded threshold inside the bottom side of the pipe.

In order to ensure uniform liquid drainage along the longitudinal axis of the drainage apparatus, the distances of the drainage openings can be staggered. The spacing of the openings should increase with the proximity to the siphon bow to compensate for the pressure loss in the drainage pipe in the direction of flow. An alternative possibility consists in the reduction of the opening cross-sectional areas with constant opening intervals.

Another advantageous embodiment variant of the present invention provides a bleed valve for venting the cover. The drainage of the water is produced by the venting.

Alternatively, a three-way valve can be provided for introducing, venting and holding the compressed air in the cover(s).

In the case of correspondingly large tanks, several discharge devices can be provided which preferably form a linear structure. In this case, the control of the individual discharge devices can be effected individually or together. Alternatively, the discharge devices may also form an annular structure. For example, a circular tank can be provided in the edge region with a concentrically disposed arrangement of discharge devices.

The present invention is explained in more detail below with reference to the exemplary embodiments shown in the schematic drawings, wherein.

Figure 1:
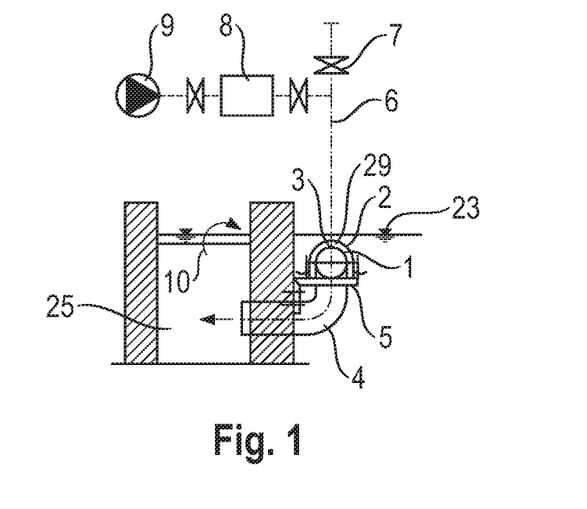
FIG. 1 shows a sectional view of a drainage apparatus according to the invention.
Figure 2:
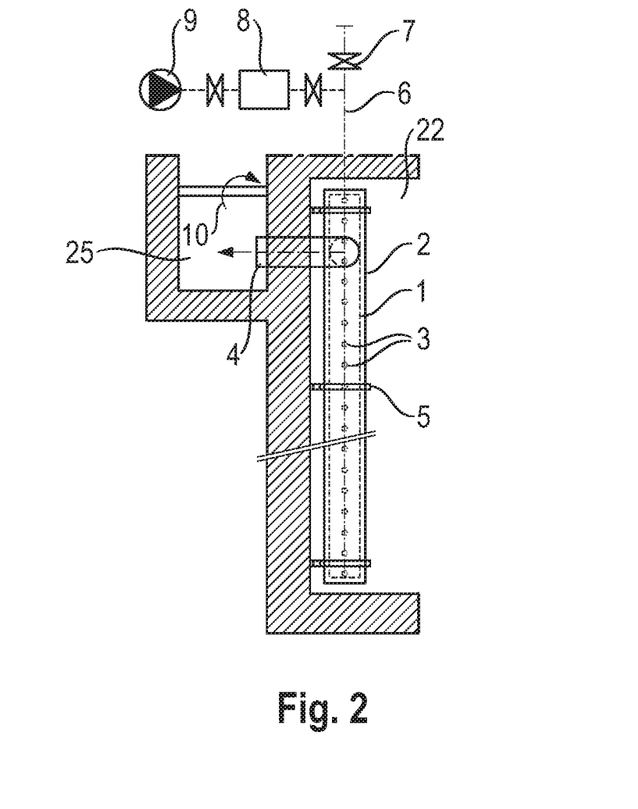
FIG. 2 shows the drainage apparatus of FIG. 1 in a top view.

The draining apparatus of FIG. 1 and FIG. 2 consists of a discharge device in the form of a drainage pipe 1 with a horizontal axis which is arranged completely below the liquid level in a tank 22 on a fixed console 5. A plurality of drainage openings 3 are provided on the top side of the drainage pipe 1. The drainage pipe 1 is concentrically covered by a cover 2 in the form of a pipe half-shell, so that an annular space is produced between the drainage pipe 1 and the cover 2.

The water which has penetrated the drainage pipe 1 is supplied via a pressure line and siphon bow 4 connected to the drainage pipe 1 into an overflow space 25, which is terminated by an overflow weir 10.

Compressed air can be introduced into the annular space via a compressed air line 6, wherein the compressed air is generated by a compressor 9, which is connected to a pressure wind vessel 8. Valves 7 control the supply and discharge of compressed air.

If the draining weir is set too low, the water level 23 can drop to the height of the drainage openings 3. A further sinking is not possible with the opened air discharge valve, since no vacuum can build up due to the venting of the high point and therefore the vessel cannot be emptied further according to the lifter principle. An increase in the water level 23 above the level of the inflow openings is then only possible if the compressed air cushion in the annular space again drops below the level of the inflow openings and the hydrostatic pressure on both sides of the pressure sensor is the same. This means that the difference in the water level between the tank water level 23 and the lower edge of the air cushion in the annular space is equal to the water level difference on the outlet side between the water level in the drainage shaft and the water level in the drainage pipe. This means that as the water level 23 rises in the tank 22, the water level difference on the outlet side must be correspondingly increased by means of an additional air inlet into the region of the drainage pipe 1, or the draining weir can be increased.

The drainage apparatus is best suited for cyclic waste water treatment processes with a largely constant water level. In particular, the invention relates to methods in which the feed is conducted alternately between parallel tanks, and this feed displaces the supernatant water from the tank at approximately constant water level.

Figure 3:
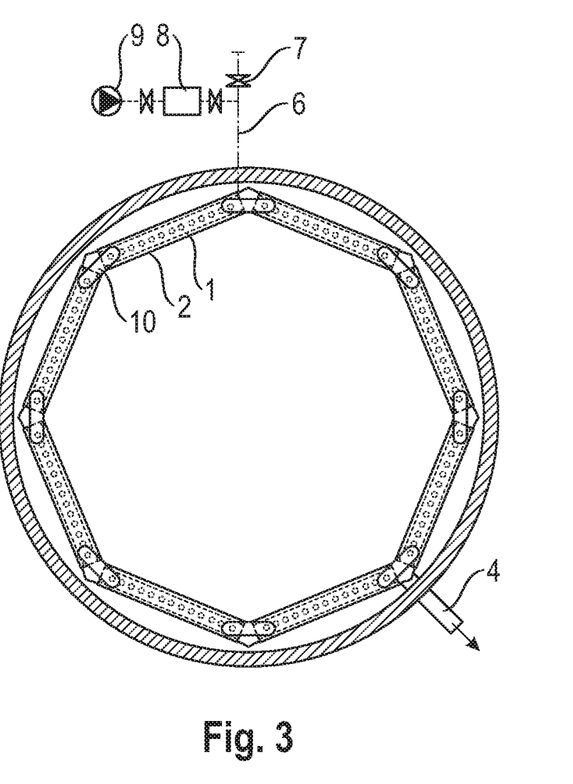
FIG. 3 shows an alternative embodiment in a plan view.

FIG. 3 shows a variant with an annular arrangement of drainage pipes 1, which are connected to one another by means of corresponding connecting pieces 10.

Figure 4:
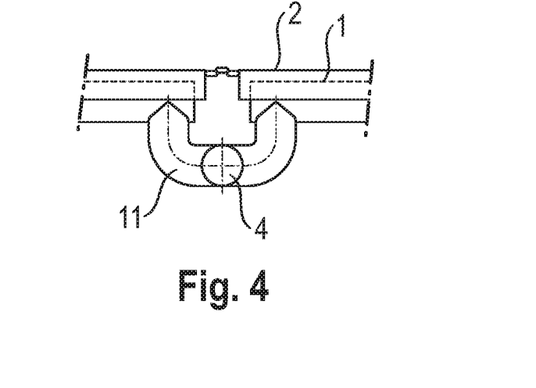
FIG. 4 shows a detail of FIG. 1.

FIG. 4 shows in detail the connection of the pressure pipe 4 in the region of a connecting piece 11 between two drainage pipes 1.

Figure 5:
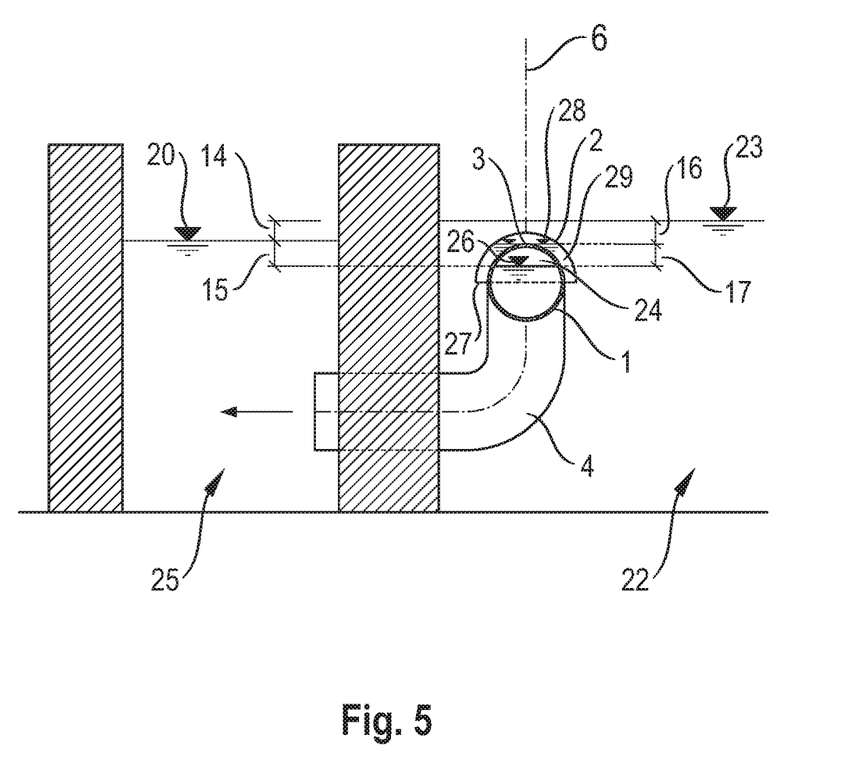
FIG. 5 shows a view corresponding to FIG. 1, explaining the propagation of the air cushion when the blocking volume is filled.

FIG. 5 shows the dynamics during the filling of the blocking volume 24: The following differences in height are presented for explanation:

14: Difference in height between the water level 20 in the overflow space 25 and the water level 23 in the tank 22.

15: Difference in height between the water level 26 in the pipe 1 and the water level 20 in the overflow space 25.

16: Difference in height between the water level 28 in the annular space 29 and the water level 23 in the tank 22.

17: Difference in height between the water level 26 in the pipe 1 and the water level 28 in the annular space 29.

During the drainage of the liquid, the water level 20 during the weir overflow is lower than in the tank 22 due to the friction losses in the draining apparatus. Then the blocking volume 24 is filled with pressure ($p_{com}$) via the compressed air line 6 at the top of the cover. The air cushion propagates from there and reaches the drainage openings and prevents further inflow of the liquid. It forms an equilibrium between the hydrostatic head 15 ($p_{in} = \varrho_w * g * h_{in}$) on the air cushion from the inside of siphon bow 4 and the pressure head 16 ($p_{ex} = \varrho_w * g * h_{ex}$) on the air cushion from the outside of the tank. The two hydrostatic pressures are therefore equally large by disregarding the weight of the air cushion and the overpressure of the compressed air must overcome this back pressure. The height difference 17 of these two hydrostatic pressure surfaces corresponds to the height difference 14 between the tank water level 23 and the overflow height 20. Similarly, the elevation differences 15 and 16 are also equal.

Figure 6:
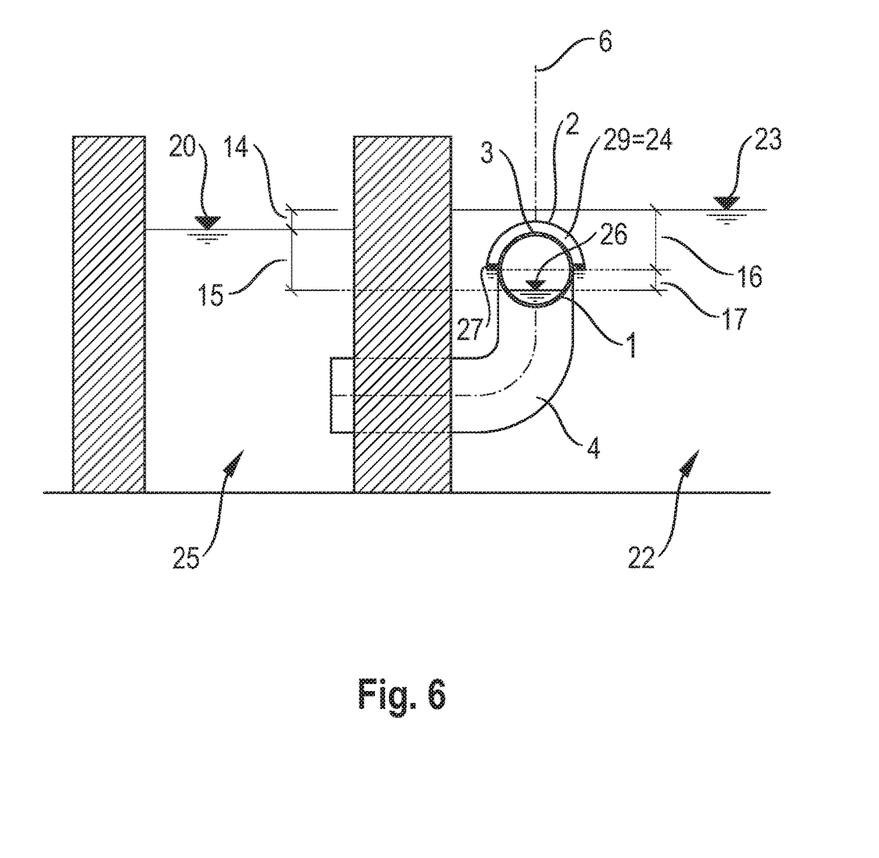
FIG. 6 shows a view corresponding to FIG. 1, explaining the achievement of the pressure equilibrium after filling of the blocking volume.

FIG. 6 shows the attainment of a stationary pressure equilibrium. The air cushion extends on the outer side to the draining edges and excess air rises to the surface of the tank.

On the inside, the air cushion extends so far into the drainage pipe or into the siphon bow 4, so that the pressure level 15 also corresponds here to the overflow height 20 of the height difference 16 between draining edge 27 and tank water level 23.

Figure 7:
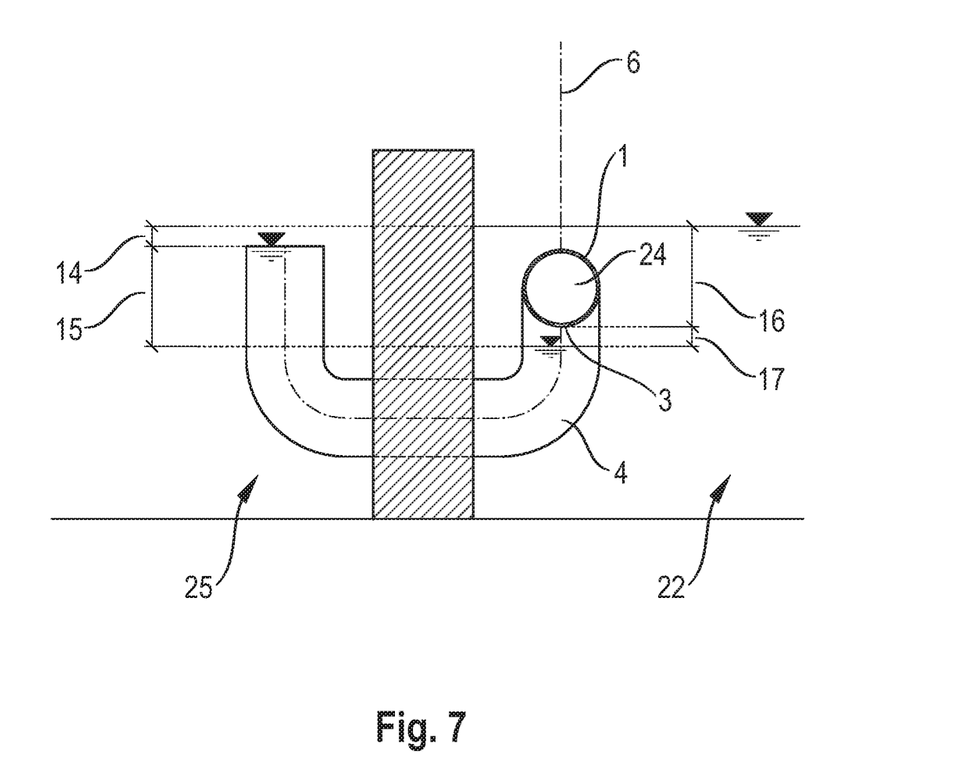
FIG. 7 shows an alternative embodiment without cover.

FIG. 7 shows a variant without cover. In this case, the compressed air is directly pressed into the apex of the drainage pipe 1, and the air cushion then reaches as far as the drainage openings 3 attached to the underside of the pipe and excess compressed air escapes through these drainage openings 3.

Figure 8:
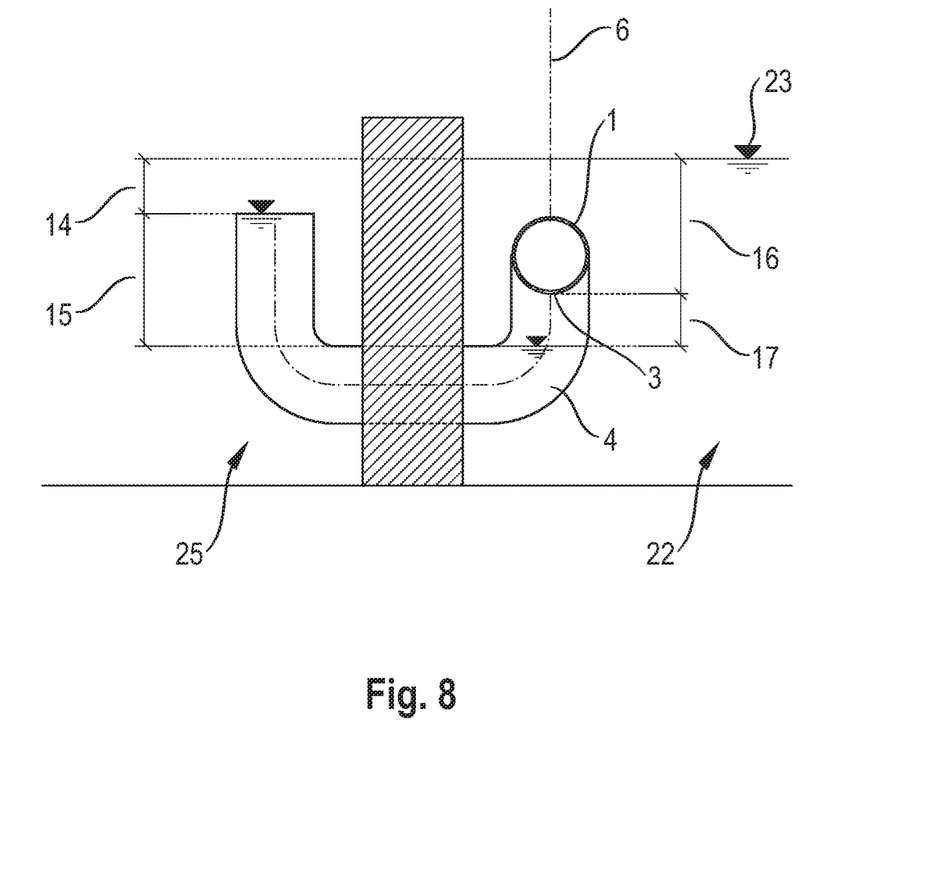
FIG. 8 shows the embodiment variant of FIG. 7 with an air cushion in the drainage pipe and siphon bow at maximum filling level in the tank.

FIG. 8 shows the maximum possible tank filling height at given siphon and overflow heights. The maximum tank water level sensor presses the filled blocking volume 24 until the minimum through-flow height of the siphon bow 4 is reached and additional compressed air can escape in the direction of overflow.

Figure 9:
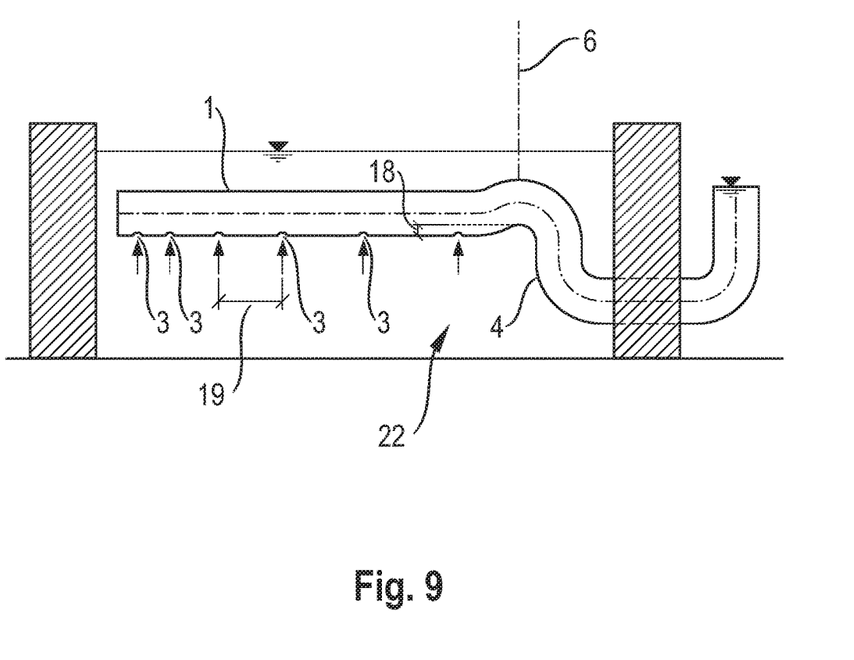
FIG. 9 shows the embodiment variant of FIG. 7 in longitudinal section with a threshold and staggered distances of the drainage openings.

In FIG. 9, a longitudinal section through the draining apparatus without cover (see FIG. 7 and FIG. 8) is shown. By the arrangement of a threshold with the height 18, water inlets due to pressure fluctuations by ventilation in the tank for example are prevented. The staggered distances 19 of the drainage openings 3 are intended to make the liquid intake uniform as the inlet speed increases along the longitudinal axis of the draining apparatus.

The present invention makes it possible to robustly control the drainage of water from clarification tanks or the like in a very simple manner.

The invention claimed is:

1. A draining apparatus for draining water from a tank (22), comprising a discharge device (1) immersed in the tank (22) and having drainage openings (3) which open into the tank (22), wherein a device is provided for selectively supplying compressed air into a blocking volume (24), wherein the draining apparatus is fixedly mounted in the tank (22), and wherein the discharge device is designed as a horizontally disposed drainage pipe (1) and a uniform drawing-in of the liquid into the draining apparatus is achieved by an expansion of a distance (19) of the drainage openings (3) in the flow direction in the drainage pipe (1) or by reducing widths of the drainage openings (3) in the direction of flow in the drainage pipe (1).

2. The draining apparatus according to claim 1, wherein the discharge device (1) is closed upwards by a cover (2) in order to form the blocking volume (24) between the discharge device (1) and the cover (2).

3. The draining apparatus according to claim 2, wherein the cover (2) is formed as a concentric body in relation to the drainage pipe (1), which body has on its underside at least one draining edge (27), and an annular space (29) of substantially uniform thickness is formed between the drainage pipe (1) and the body.

4. The draining apparatus according to claim 2, wherein the cover (2) is designed to be liftable or removable.

5. The draining apparatus according claim 1, wherein the drainage openings (3) are arranged on the upper side thereof.

6. The draining apparatus according to claim 1, wherein the drainage openings (3) are arranged below a liquid level (23) which is to be kept constant.

7. The draining apparatus according to claim 1, wherein the discharge device (1) is connected via a siphon bow (4) to an overflow space (25) which is sealed by an overflow weir.

8. The draining apparatus according to claim 1, wherein the drainage openings (3) are arranged on the underside thereof, so that the blocking volume is arranged in the interior of the drainage pipe (1).

9. The draining apparatus according to claim 1, including a bleed valve (7) for venting the blocking volume (24).

10. The draining apparatus according to claim 1, including a three-way valve for introducing, venting or maintaining compressed air in the blocking volume (24).

11. The draining apparatus according to claim 1, including two mutually parallel draining edges.

12. The draining apparatus according to claim 1, including a plurality of discharge devices (1) which form a linear structure.

13. The draining apparatus according to claim 1, including a plurality of discharge devices (1) which form an annular structure.

14. The draining apparatus according to claim 1, including a pressure wind vessel (8).

15. The draining apparatus according to claim 1, wherein a distance between an overflow weir and the apex of a siphon bow (4) is at least as great as a distance between the drainage edge and a maximum water level.

16. The draining apparatus according to claim 1, wherein a threshold in the drainage pipe (1) is at least as high as pressure level fluctuations to be expected in the tank (22).

* * * * *